United States Patent
Bae et al.

(10) Patent No.: US 9,479,504 B2
(45) Date of Patent: Oct. 25, 2016

(54) METHOD AND APPARATUS FOR CONTROLLING ACCESS BETWEEN HOME DEVICE AND EXTERNAL SERVER IN HOME NETWORK SYSTEM

(71) Applicant: Samsung Electronics Co., Ltd., Suwon-si, Gyeonggi-do (KR)

(72) Inventors: Eun-Hui Bae, Seoul (KR); Yong Chang, Seongnam-si (KR); Dong-Keon Kong, Suwon-si (KR); Se-Hoon Kim, Seoul (KR); Hyoung-Kyu Lim, Seoul (KR); Chi-Hong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/101,816

(22) Filed: Dec. 10, 2013

(65) Prior Publication Data

US 2014/0165160 A1 Jun. 12, 2014

(30) Foreign Application Priority Data

Dec. 10, 2012 (KR) .................. 10-2012-0142667

(51) Int. Cl.
*H04L 29/06* (2006.01)
*G06F 21/10* (2013.01)
*H04L 12/28* (2006.01)

(52) U.S. Cl.
CPC .............. *H04L 63/10* (2013.01); *G06F 21/10* (2013.01); *H04L 12/2836* (2013.01); *H04L 63/104* (2013.01)

(58) Field of Classification Search
CPC ........... G06F 21/10; G06F 2221/2141; H04L 63/10; H04L 12/2803

USPC ............................................. 726/4; 713/168
See application file for complete search history.

(56) References Cited

U.S. PATENT DOCUMENTS

| | | | |
|---|---|---|---|
| 2002/0180581 A1 | 12/2002 | Kamiwada et al. | |
| 2006/0079231 A1* | 4/2006 | Jeong | G06F 21/31 455/434 |
| 2006/0168264 A1* | 7/2006 | Baba | H04L 12/2809 709/230 |
| 2007/0097860 A1 | 5/2007 | Rys et al. | |
| 2007/0174659 A1* | 7/2007 | Takuwa | G06F 11/2025 714/4.1 |
| 2008/0026725 A1 | 1/2008 | Cha | |
| 2009/0254980 A1 | 10/2009 | Kanaparti | |

(Continued)

FOREIGN PATENT DOCUMENTS

| | | |
|---|---|---|
| EP | 1 603 269 A1 | 12/2005 |
| JP | 2002-354557 A | 12/2002 |

(Continued)

OTHER PUBLICATIONS

Li et al., The Design and Implementation of Home Network System Using OSGi Compliant Middleware, IEEE, vol. 50, pp. 528-534.*

(Continued)

*Primary Examiner* — Dao Ho
(74) *Attorney, Agent, or Firm* — Jefferson IP Law, LLP

(57) ABSTRACT

A method for controlling access between home devices and servers in a home network system is provided. The method includes determining whether first access of the home devices to each of the servers and second access of the servers to each of the home devices is restricted, and controlling the first access and second access based on respective access rights established according to the determination.

8 Claims, 8 Drawing Sheets

(56) References Cited

U.S. PATENT DOCUMENTS

| | | | |
|---|---|---|---|
| 2010/0107225 A1* | 4/2010 | Spencer | H04L 63/0876 726/4 |
| 2011/0173685 A1* | 7/2011 | Chai | H04L 41/0806 726/6 |
| 2012/0109384 A1* | 5/2012 | Stepanian | G06F 21/10 700/275 |
| 2012/0147872 A1* | 6/2012 | Zisimopoulos et al. | 370/338 |
| 2014/0007222 A1* | 1/2014 | Qureshi | G06F 21/10 726/16 |

FOREIGN PATENT DOCUMENTS

| | | |
|---|---|---|
| KR | 10-2007-0043486 A | 4/2007 |
| KR | 10-2008-0011581 A | 2/2008 |

OTHER PUBLICATIONS

XP017548387 "Proposal for revised draft Recommendation X.homesec-4:Authorization framework for home network", Sep. 5, 2008.

* cited by examiner

METHOD AND APPARATUS FOR CONTROLLING ACCESS BETWEEN HOME DEVICE AND EXTERNAL SERVER IN HOME NETWORK SYSTEM

CROSS-REFERENCE TO RELATED APPLICATION(S)

This application claims the benefit under 35 U.S.C. §119 (a) of a Korean patent application filed on Dec. 10, 2012 in the Korean Intellectual Property Office and assigned Serial No. 10-2012-0142667, the entire disclosure of which is hereby incorporated by reference.

TECHNICAL FIELD

The present disclosure relates to a method and apparatus for controlling access between home devices and an external server through a home gateway in a home network system.

BACKGROUND

In general, a home network system includes one or more home devices and a home gateway for controlling the home devices. The home devices are able to communicate with the home gateway in a wired or wireless communication mode. The home devices may include smart appliances, such as a refrigerator, a washing machine, and a robot cleaner, lighting devices, security devices, such as cameras and door-lock systems, and energy devices, such as a power measurement device, a power socket, and a multi-tab.

The home devices support a variety of service related applications and functions, and may provide the user with a service obtained from a server with each application or service function. In the course of providing the service, various information is created by the home device, which can be used to create new services and thus, new additional values. Thus, the value of the information available for developing new services and providing customer services are growing over time. As the value of the information that can be obtained from the home devices increases, a need exists for technologies and measures to secure and monopolize access information in order to provide a differentiated service to each service provider.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for establishing and managing an access right for access control between a home device and an external server via a home gateway in a home network system.

The present disclosure provides a method and apparatus for providing a service provider or server with a differentiated service per home device or per application or function that the home device supports, by controlling access to a home device or the server using an access right registered in the home gateway in the home network system.

In accordance with an aspect of the present disclosure, a method for controlling access between home devices and servers in a home network system is provided. The method includes determining whether first access of the home devices to each of the servers and second access of the servers to each of the home devices is restricted, and controlling the first access and second access based on respective access rights established according to the determination.

In accordance with another aspect of the present disclosure, an apparatus for controlling access between home devices and servers in a home network system is provided. The apparatus includes a controller configured to determine whether first access of the home devices to each of the servers and second access of the servers to each of the home devices is restricted, and to control the first access and second access based on respective access rights established according to the determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

The terminology used herein is for the purpose of describing particular embodiments only and is not intended to be limiting of the disclosure.

It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
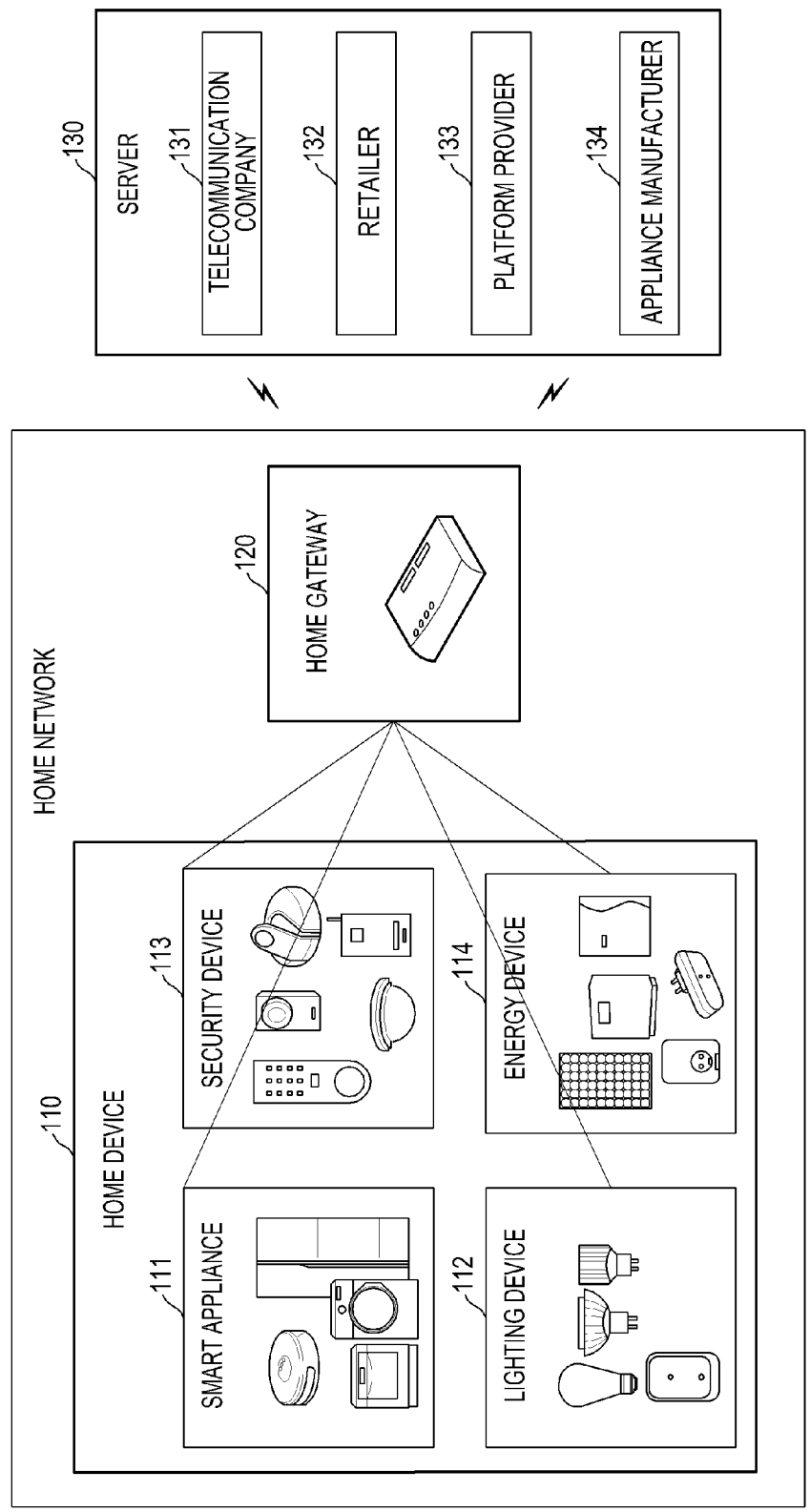
FIG. 1 is a structural diagram of a home network system according to an embodiment of the present disclosure.

FIG. 1 illustrates an example of a structure of an ordinary home network according to an embodiment of the present disclosure.

Referring to FIG. 1, the ordinary home network system may include multiple home devices 111 to 114 (collectively, 110) and a home gateway 120.

The home devices 110 may be various electronic devices found at homes or offices, including e.g., smart appliances 111, such as a refrigerator, a washing machine, and a robot cleaner, lighting devices 112 that are controllable via the home gateway 120, security devices 113, such as a camera and a door-lock system, and energy devices 114, such as a power measuring device, a power socket, and a multi-tab.

The home devices 100 may support various functions and include applications to control the functions. As an example of the smart electronic devices 111, a refrigerator may support functions of e.g., temperature control, lighting management, and power management. The temperature control function may be controlled by e.g., an application to control the temperature in the fridge/freezer of the refrigerator depending on, e.g., the season or day and night, or an application to recognize content stored in the refrigerator and adjust the temperature of the fridge/freezer to a proper temperature for the content. The lighting management function may be controlled by, e.g., an application to control brightness and color of the light depending on the nature of the content stored in the refrigerator, or an application to control the light depending on the condition of the content stored in the refrigerator.

The home devices 110 may communicate with the home gateway 120 in their respective wired or wireless communication mode. The home devices 110 are evolving into a form of smart devices configured to receive a control command from the home gateway 120 and send a server that provides a desired service desired information through the home gateway 120. The home gateway 120 may also communicate with the home devices 110 on cable or wirelessly, control the home devices 110, and collect and manage information from the home devices 110. In particular, the home gateway 120 may be connected to a server of a service provider 130 over the Internet or any other communication network. The service provider 130 may include any of servers hosted by a telecommunication company 131 that provides communication services to the home devices 110, a retailer 132, a company 133 that provides software, such as a platform, an application, etc. that the home devices 110 support, and an appliance manufacturer 134 that provides information regarding the home devices 110. The home gateway 120 may connect any of the servers to any of the home devices 110.

A server of the service provider 130 may provide a service to a corresponding home device through the home gateway 120 that is connected to the service provider 130 over a wired or wireless network. As home devices get smarter along with the continuous evolution of communication systems, applications and service functions that the home devices support are being diversified and evolving. Accordingly, a need exists for a method for more efficiently managing functions of the diversified and evolving home devices.

In the present disclosure, a method and apparatus for enabling a home gateway to control access of each home device to a server and access of each server to a home device in a home network system is provided. In some embodiments of the present disclosure, an access right for controlling the access may be established for each function or application of a home device or a server. Specifically, in an embodiment of the present disclosure, for restriction of access of each home device to a server, the home gateway may receive from the home device a request to establish an access right to the server, or may determine on its own whether to establish an access right for the home device to a server. The home gateway may then create the access right for each home device to the server by performing a process of establishing the access right with the server. The home gateway may then restrict access of each home device to the server based on the access right.

In an embodiment of the present disclosure, for restriction of access to a home device from each server, the home gateway may receive from each server a request to establish an access right of the server to a home device, or may determine on its own whether to establish an access right of each server to a home device. The home gateway may then perform a process of establishing the access right of the server with the home device and create the access right of the server to the home device. The home gateway may then restrict access of each server to the home device based on the access right.

Figure 2:
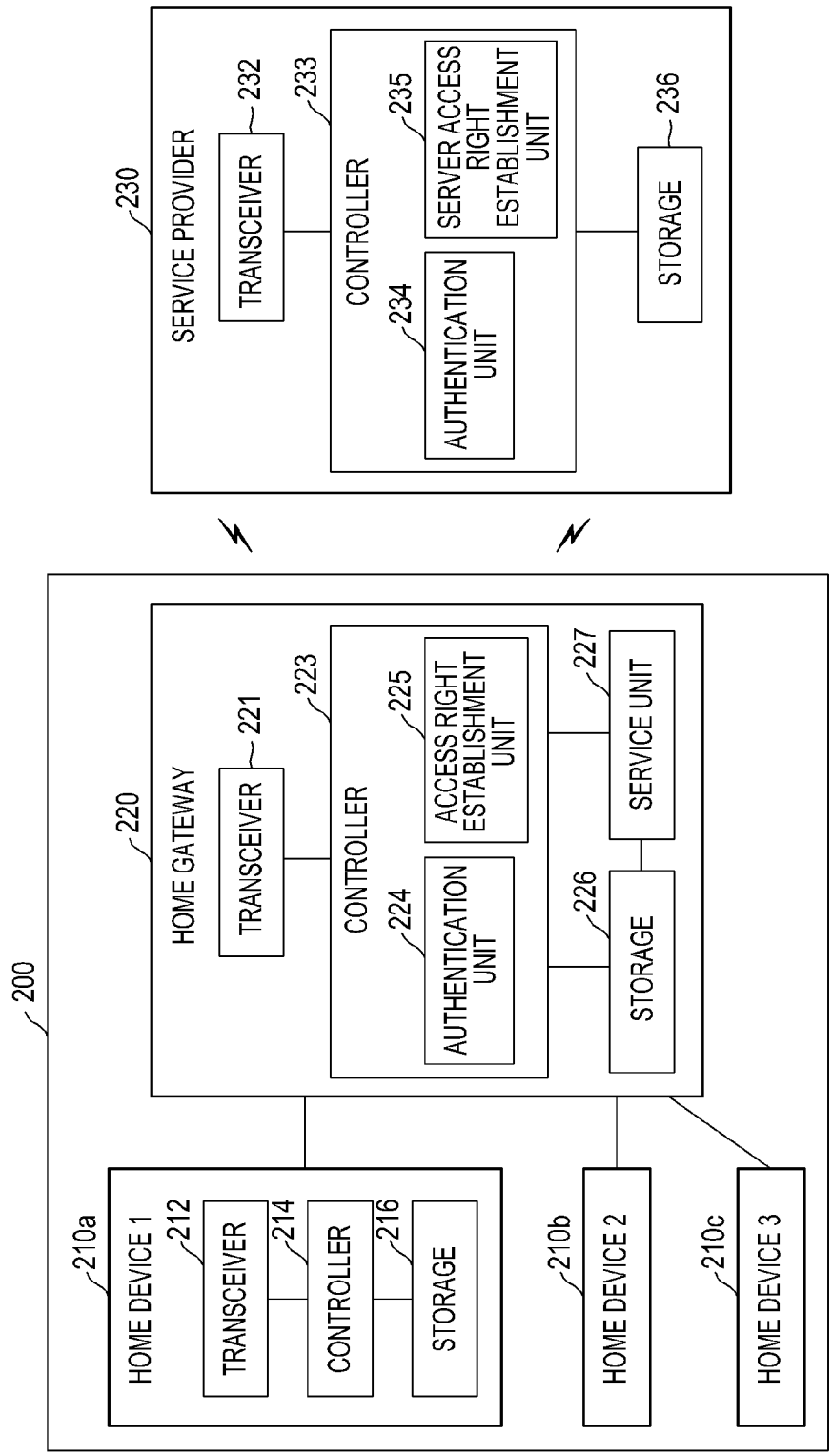
FIG. 2 is a detailed structure of a home network system according to an embodiment of the present disclosure.

FIG. 2 is a detailed structure of a home network system according to an embodiment of the present disclosure.

Referring to FIG. 2, a home network system 200 may include, e.g., home devices 1, 2, and 3 210a, 210b, and 210c and a home gateway 220. For convenience of explanation, each element included in the home network system 200 is described on a functional basis. However, the elements of the home network system 200 may also be combined or sub-divided to provide a function.

An embodiment of the present disclosure according to which the home network system 200 operates will now be described.

The home device 1 210a may include, e.g., a transceiver 212, a controller 214, and a storage 216. The home device 2 210b and the home device 3 210c may be configured similarly to the home device 1 210a, so the detailed description thereof will be omitted herein. The transceiver 212 may receive from the user information regarding servers that may restrict access of the home device 1 210. The information may be specified for each application or function that the home device 1 210a supports. The controller 214 may then determine to make a request to establish an access right of the home device 1 210a. The controller 214 may send the request to the home gateway 220. Upon determination that the transceiver 212 has received from the home gateway 220 a reply to the request, the controller 214 may store the reply in the storage 216. The request to establish an access right may include a request for at least one of creation, update, and deprivation of the access right. The controller 214 may store information about an access right for each application or function that the home device 1 210a supports as performance information of the home device 1 210a.

The home gateway 220 may include, e.g., a transceiver 221, a controller 223, a storage 226, and a service unit 227. In some embodiments, the controller 223 may include an authentication unit 224 and an access right establishment unit 225. While illustrated as being separate from home devices, the home gateway 220 may be integrated into the home device in other embodiments, in which case each home device is directly connected to a corresponding server, establishing the access right with the server and performing a resultant service.

Herein assume that the transceiver 221 has received a request to establish an access right to a server 230 of at least one of the home devices 1, 2 and 3 210a, 210b, and 210c, e.g., the home device 2 210b. Then the transceiver 221 may send the request to the server 230 under control of the controller 223. The request may include an entity IDentity (ID) of the home device 2 210b and identification information of a target entity, for which the access right of the home device 2 210b is to be created, e.g., the server 230. In addition, the request may include e.g., information indicating an application or function, which is the target entity for which the access right of the home device 2 210b is to be created.

In return, the transceiver 221 may receive a reply to the establishment request from the server 230. The authentication unit may check the reply for information indicating whether the home device 2 210b has access to the server 230, and send the information to the access right establishment unit 225. If the information indicates that the home device 2 210b has access to the server 230, the access right establishment unit 225 may set the access right of the home device 2 210b to the server 230 to be 'allowed'. If the information indicates that the home device 2 210b does not have access to the server 230, the access right establishment unit 225 may set the access right of the home device 2 210b to the server 230 to be 'disallowed'.

The access right establishment unit 225 may send the set access right information to the storage 226. The storage 226 may then store the access right information by mapping it onto the requesting entity, e.g., the home device 2 210b and the target entity, e.g., the server 230. The storage 226 may also store access right information set for each application or function that the home device 2 210b supports.

After this, the service unit 227 may restrict access of the home device 2 210b to the server 230 based on the access right information stored in the storage 226. For example, if the home device 2 210b attempts to access a particular server, the service unit 227 may check access right information set for the home device 2 210b from the authentication unit 224. If the access right information is set to be 'allowed', the controller 223 may allow the home device 2 210b to access the server 230.

The server 230 located outside of the home network 200 may be connected to the home gateway 220 over a wired or wireless network. The server 230 may include a transceiver 232, a controller 233, and a storage 236. In some embodiments, the controller 233 may include an authentication unit 234 and a server access right establishment unit 235. The transceiver 232 may receive a request to create an access right from a particular home device via the home gateway 220. The creation request may include an entity ID of the particular home device, which is a requesting entity as well as performance information of the particular home device. The authentication 234 may then determine whether there is a matching entity ID among pre-stored entity IDs of home devices having access to the server 230. If it is determined that there is a matching entity ID, the server access right establishment unit 235 may set an access right for the entity ID to be 'allowed' and store the access right information by mapping it onto the entity ID. Otherwise, if it is determined that there is no matching entity ID, the server access right establishment unit 235 may set an access right for the entity ID to be 'disallowed' and store the access entity information in the storage 236 by mapping it onto the entity ID. The controller 233 may send the access right information of the entity ID to the home gateway 220 through the transceiver 232. Alternatively, in other embodiments, the controller 233 may send information indicating whether the entity ID has access to the server 230 to the home gateway 220 as a reply to the request to create an access right.

The home devices 210a, 210b, and 210c, home gateway 220 and servers including the server 230 operate similarly not only for the request to create an access right but also for requests for update and deprivation of the access right. Update and deprivation operations will be discussed with reference to FIGS. 3 to 6B below.

Another embodiment of the present disclosure according to which the home network system 200 operates will now be described.

Herein, assume that the server 230 attempts to access a particular home device, e.g., the home device 1 210a via the home gateway 220. In this case, the controller 233 may determine to make a request to establish an access right of the server 230 to the home device 1 210a based on information regarding home devices that restrict access thereto, and send the establishment request to the home gateway 220 through the transceiver 232. Upon determination that the transceiver 232 has received from the home gateway 220 a reply to the establishment request, the controller 233 may check the reply for access right information and store the access right information in the storage 236. The establishment request may include a request for at least one of creation, update, and deprivation of the access right. The storage 236 may also store information about home devices to which the server 230 has access as performance information of the server 230.

In the home gateway 220, upon reception of the request to establish an access right from the server 230, the transceiver 221 may send the request to the authentication unit 224 upon control of the controller 223. The authentication unit 224 checks the establishment request for an entity ID of a requesting entity, e.g., the server 230 and identification information of a target entity, e.g., the home device 1 210a. The authentication unit 224 may check the establishment request for information indicating whether the server 230 has access to the home device 1 210a and send the information to the access right establishment unit 225. If the information indicates that the server 230 has access to the home device 1 210a, the access right establishment unit 225 may set the access right of the server 230 to the home device 1 210a to be 'allowed'. Otherwise, if the information indicates that the server 230 does not have access to the home device 1 210a, the access right establishment unit 225 may set the access right of the server 230 to the home device 1 210a to be 'disallowed'.

The controller 223 may send the access right information to the storage 226. The storage 226 may then store the access right information by mapping it onto the requesting entity, e.g., the server 230 and the target entity, e.g., the home device 1 210a. Accordingly, the storage 226 may store access right information for each application or function that the home device 2 210b supports.

Then the service unit 227 may restrict access of each server to the corresponding home device based on its access right information. For example, if the server 230 attempts to access the home device 1 210a, the service unit 227 checks the access right set for the server 230 from the authentication unit 224. If the access right information for the server 230 to the home device 1 210a is set to be 'allowed', the service unit 227 may allow the server 230 to access the home device 1 210a.

First Embodiment

In the first embodiment, a home gateway may perform an establishment process with a server by receiving a request to establish an access right to the server from any of the home devices or determining on its own whether to establish an access right of the home device to the server. The establishment process may include at least one of creation, update, and deprivation of the access right. For convenience of explanation, an example of creating/updating/depriving of an access right to a server, e.g., the server 230, will now be described in conjunction with the home network system 200 of FIG. 2. However, in other embodiments of the present disclosure, an access right of each home device connected to the home gateway 220 to each server to which the home device has access may be created, updated or deprived of, as will be discussed with reference to FIGS. 3 to 6B.

Figure 3:
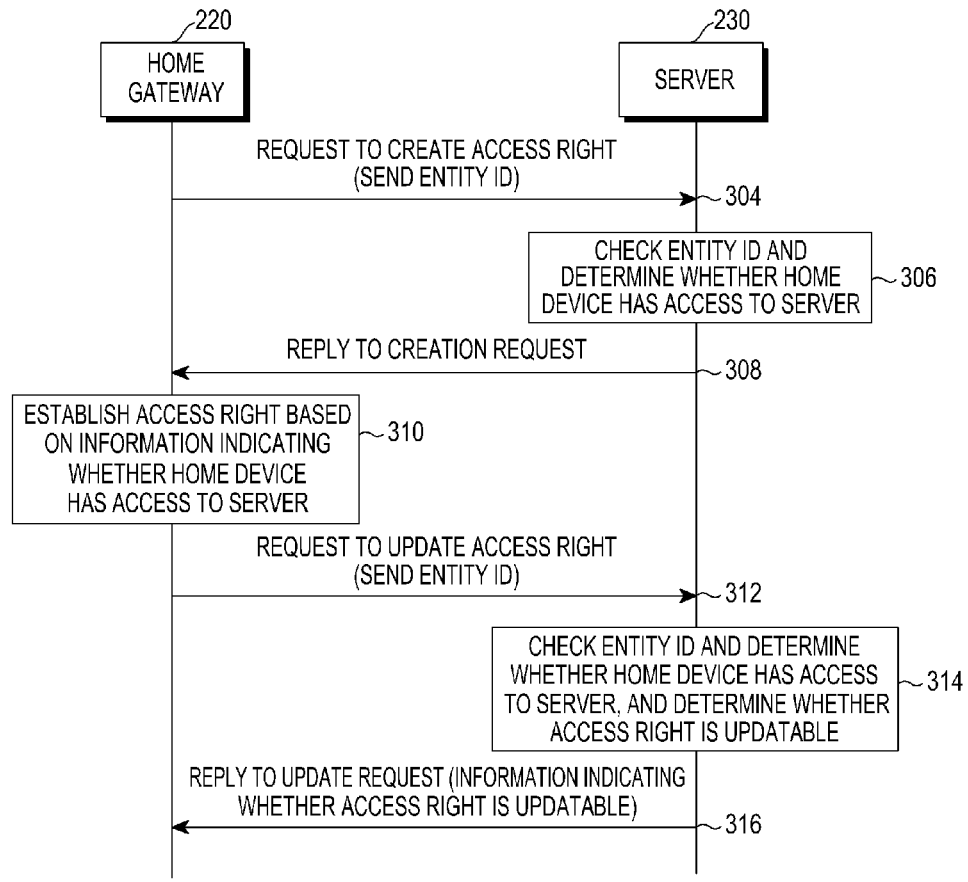
FIG. 3 is flowchart illustrating operations between a home gateway and a server creating and updating an access right of a home device to the server according to an embodiment of the present disclosure.

FIG. 3 is flowchart illustrating operations between the home gateway 220 and the server 230 creating and updating an access right of a home device to the server 230 according to an embodiment of the present disclosure.

Referring to FIG. 3, assume that the home gateway 220 determines to create an access right of a particular home device to a server, e.g., the server 230, or receives from the home device a request to create the access right to the server 230. The creation request may include an entity ID of the requesting entity, i.e., of the home device and identification information of a target entity, i.e., the server 230, for which the access right of the home device is to be created. The home gateway 220 may then identify the server 230 corresponding to the identification information. In operation 304, the home gateway 220 may send the creation request to the server 230. The creation request may include, for example, an entity ID of the home device and identification information of the server 230.

In operation 306, the server 230 may determine whether the home device having the entity ID obtained from the creation request is one that has access to the server 230. For example, assume that the server 230 pre-stores entity IDs of home devices that have access to the server 230. If the entity ID obtained from the creation request matches one of the entity IDs pre-stored in the server 230, the server 230 may determine that the home device having the entity ID is one that has access to the server 230 and set the access right of the home device to the server 230 to be 'allowed'. Otherwise, if the entity ID obtained from the request has no match among the entity IDs pre-stored in the server 230, the server 230 may determine that the home device is one that does not have access to the server 230 and set the access right of the home device to the server 230 to be 'disallowed'.

The server 230 may store the access right information to the server 230, which is set to be 'allowed' or 'disallowed', by mapping the information onto the entity ID of the home device. In another example, the request to create the access right may include performance information of the home device. In this case, the server 230 may determine if the home device is one that has access to each application or function that the server 230 supports, by checking the performance information to determine whether the home device supports the application or function.

In operation 308, the server 230 may send the home gateway 220 a reply to the creation request. The reply may include information indicating whether the home device has access to the server 230 or access right information set by the server 230 for the home device, based on the result of operation 306. If the reply includes the information indicating whether the home device has access to the server 230, in operation 310, the home gateway 220 may establish the access right of the home device to the server 230 based on the information and store the established access right by mapping the information onto the entity ID of the home device. Specifically, if the information indicates that the home device has access to the server 230, the home gateway 220 may set the access right of the home device to the server 230 to be 'allowed'. Otherwise, if the information indicates that the home device does not have access to the server 230, the home gateway 301 may set the access right of the home device to the server 230 to be 'disallowed'. If the reply includes the access right information, in operation 310, the home gateway 220 may store the access right information by mapping it onto the entity ID of the home device. Alternatively, the home gateway 220 may store the access right information of the home device to the server 230, which is established by the home gateway 220 as described above, by mapping the access right information onto the entity ID of the home device. The home gateway 220 may send the home device the access right information for the server 230.

Herein, assume that the home gateway 220 has received a request to update the access right to the server 230 of one of home devices that the home gateway 220 manages, e.g., a first home device, from the first home device. In this case, in operation 312, the home gateway 220 may forward the update request to the server 230. Alternatively, the home gateway 220 may determine on its own whether to update the access right of the home device, due to a fault or replacement of the home device. Even in this case, the home gateway 220 may also send the update request to the server 230. The update request may include an entity ID of the home device, which is the requesting entity. In operation 314, the server 230 may determine whether the home device corresponding to the entity ID obtained from the update request is one that has access to the server 230. Also, the server 230 may determine whether the access right of the home device is updateable. In operation 316, the server 230 may send a reply to the update request to the home gateway 220. The reply may include information indicating whether update of the access right of the home device is 'allowed' or 'disallowed', which is determined by the server 230. Also, the reply may include information indicating whether the access right of the home device is updateable.

If the home gateway 220 determines from the information that update of the access right is allowed, the home gateway 220 may update the access right of the home device to the server 230. The home gateway 220 may store the updated access right information for the home device to the server 230 by mapping it onto the home device.

Although not illustrated in FIG. 3, the home gateway 220 may forward the updated access right information to the home device.

Figure 4:
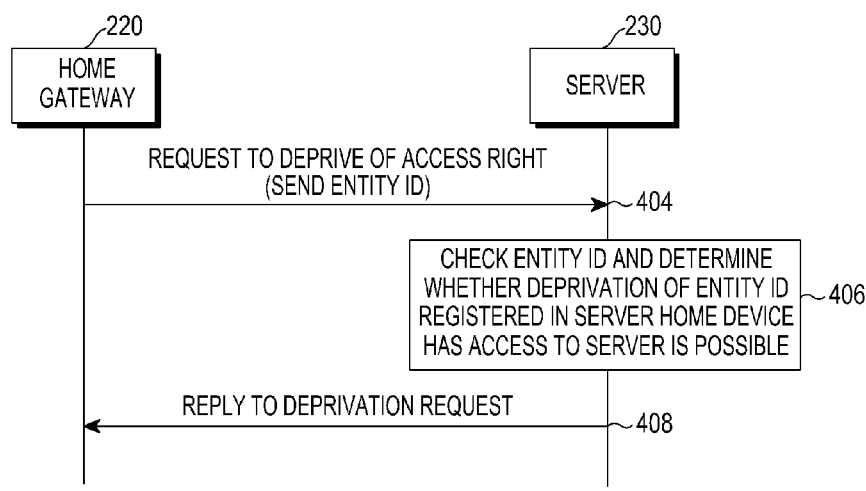
FIG. 4 is flowchart illustrating operations between a home gateway and a server depriving of an access right of a home device to the server according to an embodiment of the present disclosure.

FIG. 4 is flowchart illustrating operations between the home gateway 220 and the server 230 depriving of an access right of a home device to the server 230 according to an embodiment of the present disclosure.

Referring to FIG. 4, it is assumed that the home gateway 220 has received a request from a home device connected to the home gateway 220 to deprive of the access right of the home device to the server 230. Alternatively, the home gateway 220 may determine on its own to make a request to deprive of the access right of the home device. In operation 404, the home gateway 220 may send the deprivation request to the server 230, the deprivation request may include an entity ID of at least one home device mapped to the access right to be deprived of.

In operation 406, the server 230 may check the entity ID from the deprivation request whether it is possible to deprive of the access right of the home device corresponding to the entity ID. Specifically, the server 230 may determine whether it is possible to deprive of the access right of the home device among access rights of at least one home device corresponding to at least one entity ID stored in the server 230. If it is determined that deprivation of the access right of the home device is possible, in operation 408, the server 230 may deprive of the access right of the home device and notify the home gateway 220 that the access right of the home device is being deprived of as a reply to the deprivation request. Otherwise, if it is determined that deprivation of the access right of the home device is not possible, in operation 408, the server 230 may send the home gateway 220 a reply that the access right of the home device is not allowed to be deprived of.

Figure 5A:
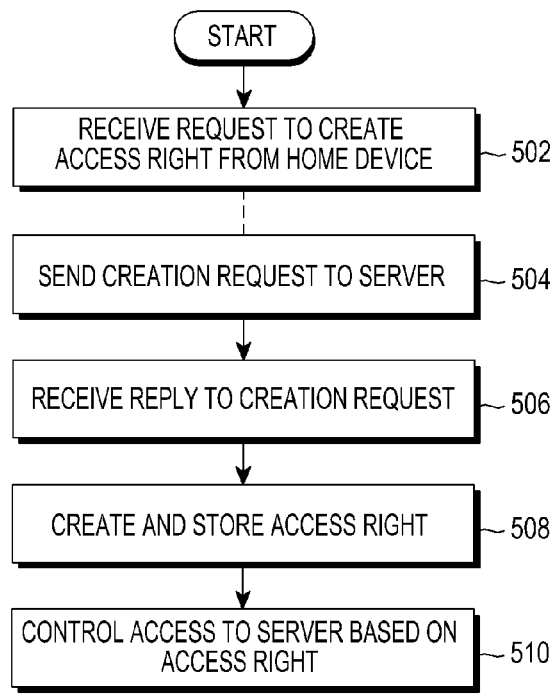
FIG. 5A is flowchart illustrating operations of a home gateway creating an access right to a server according to an embodiment of the present disclosure.

FIG. 5A is flowchart illustrating operations of a home gateway creating an access right to a server according to an embodiment of the present disclosure.

Referring to FIG. 5A, in operation 502, the home gateway may receive a request to create an access right from at least one home device. The creation request may include an entity ID of the home device and identification information of a target entity to which the access right is to be created. The home gateway 220 may identify a server indicated by the identification information obtained from the creation request. While, for convenience of explanation, a single entity ID is included in the creation request and the identification information indicates a single server in this example, the creation request may include one or more entity IDs and multiple identification information may be assigned for each entity ID in other embodiments.

In operation 504, the home gateway may forward the creation request to the identified server.

In operation 506, the home gateway may receive a reply to the creation request from the server. The reply may include information indicating whether the home device has access to the server, or access right information for the home device set by the server.

In operation 508, the home gateway may create and store an access right to the server of the at least one home device based on the information indicating whether the home device has access to the server, or may store information about the access right obtained from the reply by mapping the information onto the corresponding entity ID. For example, if the information indicates that the home device has access to the server, the home gateway may set the access right of the home device to the server to be 'allowed'. Otherwise, if the information indicates that the home device does not have access to the server, the home gateway 220 may set the access right of the home device to the server to be 'disallowed'.

In operation 510, the home gateway 220 may control access of the home device to the server based on the stored access right set for each server.

The home gateway 220 may also forward the access right information to the home device corresponding to the entity ID.

Figure 5B:
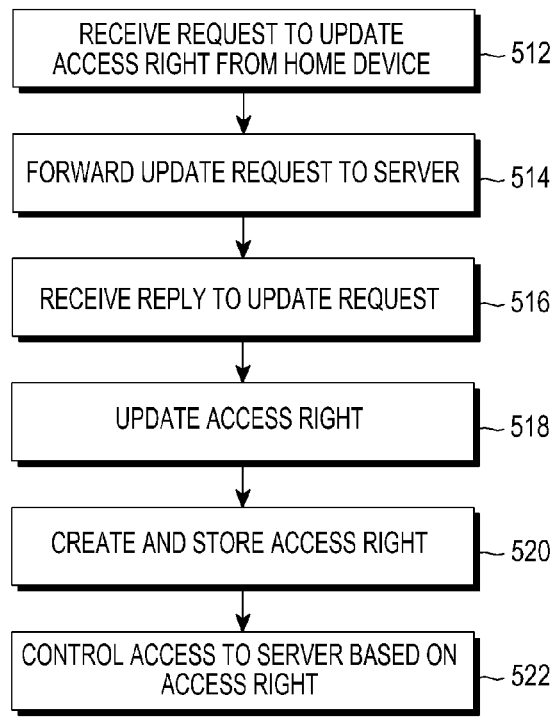
FIG. 5B is flowchart illustrating operations of a home gateway creating and updating an access right to a server according to an embodiment of the present disclosure.

FIG. 5B is flowchart illustrating operations of a home gateway updating an access right to a server according to an embodiment of the present disclosure.

Referring to FIG. 5B, in operation 512, the home gateway may receive a request to update an access right from at least one home device. The update request may include an entity ID of the at least one home device and identification information of a target entity to which the access right is to be updated. The home gateway may identify a server that corresponds to the identification information obtained from the update request.

In operation 514, the home gateway may forward the update request to the identified server.

In operation 516, the home gateway may receive a reply to the update request from the server. The reply may include information indicating whether update of the access right is allowed or disallowed. Specifically, the information may indicate whether update of the access right of the home device corresponding to the entity ID included in the update request is allowed or disallowed.

In operation 518, if the information indicates that update of the access right is allowed, the home gateway may update access right information of the at least one home device to the server. In operation 520, the home gateway may store the updated access right information by mapping the updated access right information onto the entity ID of the home device, and may forward the updated access right information to the home device.

In operation 522, the home gateway may control access of the home device to the server based on the updated access right.

Figure 6A:
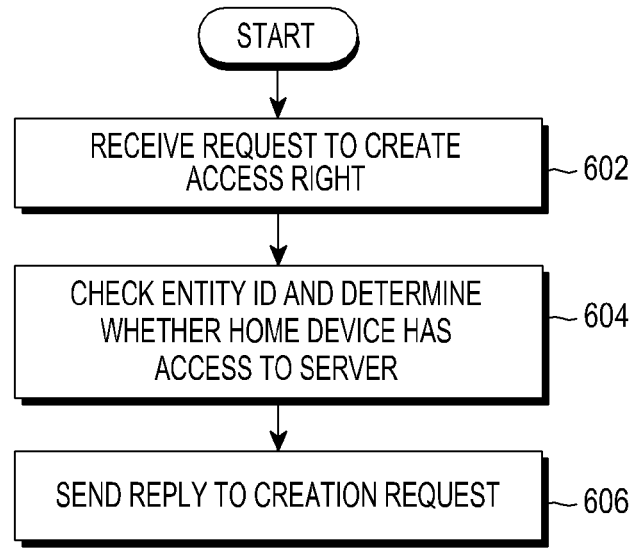
FIG. 6A is flowchart illustrating operations of a server creating an access right to the server according to an embodiment of the present disclosure.

FIG. 6A is flowchart illustrating operations of a server creating an access right according to an embodiment of the present disclosure.

Referring to FIG. 6A, in operation 602, the home gateway may receive a request to create an access right to a server from at least one home device. The creation request may include an entity ID of the home device and identification information of a target entity to which the access right is to be created.

In operation 604, the server may determine whether the at least one home device corresponding to the at least one entity ID included in the creation request has access to the server. For example, the server may determine whether the at least one entity ID included in the creation request has any match among entity IDs of home devices having access to the server. If the at least one entity ID has a match, the server may determine that the requesting home device is one that has access to the server and set the access right to the server to be 'allowed'. Otherwise, if the entity ID included in the creation request has no match among the entity IDs pre-stored in the server, the server may determine that the home device is one that does not have access to the server and set the access right to the server to be 'disallowed'.

In operation 606, the server may send the home gateway information indicating whether the home device has access to the server or access right information in the reply.

After this, the server may control access of each device to the server based on access right information set for each entity ID stored in the server.

Figure 6B:
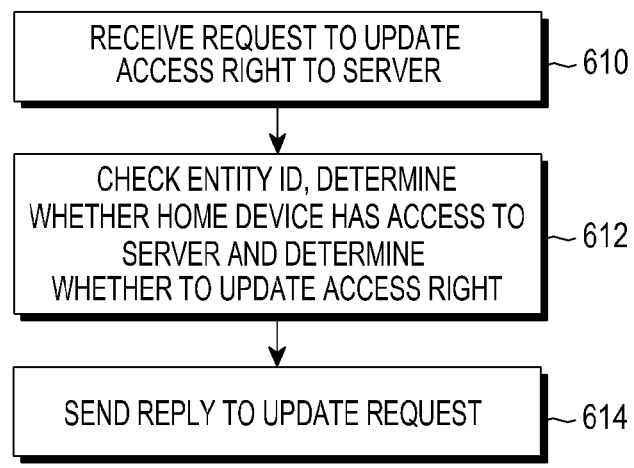
FIG. 6B is flowchart illustrating operations of a server updating an access right to the server according to an embodiment of the present disclosure.

FIG. 6B is flowchart illustrating operations of a server updating an access right of a home device to the server according to an embodiment of the present disclosure.

Referring to FIG. 6B, in operation 610, the server may receive a request to update an access right of at least one home device to the server from a home gateway. The update request may include an entity ID of the at least one home device and identification information of a target entity to which the access right is to be updated.

In operation 612, the server may determine whether the at least one home device corresponding to the entity ID included in the update request has access to the server, and may determine whether update of the access right of the at least one home device is allowed or disallowed. Furthermore, the server may configure information indicating whether update of the access right of the at least one home device is allowed or disallowed.

In operation 614, the server may send the home gateway the information indicating whether update of the access right is allowed or disallowed in a reply to the update request.

After this, the server may control access thereto for each device based on updated access right information set for each entity ID, which is stored in the server.

Second Embodiment

In the second embodiment as will be discussed below, a home gateway may receive a request to establish access rights from any server, or may determine on its own to establish an access right of each server to a home device. The establishment process may include at least one of creation, update, and deprivation of the access right. For convenience of explanation, an example of creating/updating/depriving of an access right to a home device, e.g., the home device 1 210a will now be described in conjunction with the home network system 200 of FIG. 2. In some embodiments, the access right to the home device for each application or function of a server to which the home device has access may be created, updated, or deprived of FIG. 7 is flowchart illustrating operations between the home gateway 220 and a server 230 creating and updating an access right of a server to a home device according to an embodiment of the present disclosure.

Figure 7:
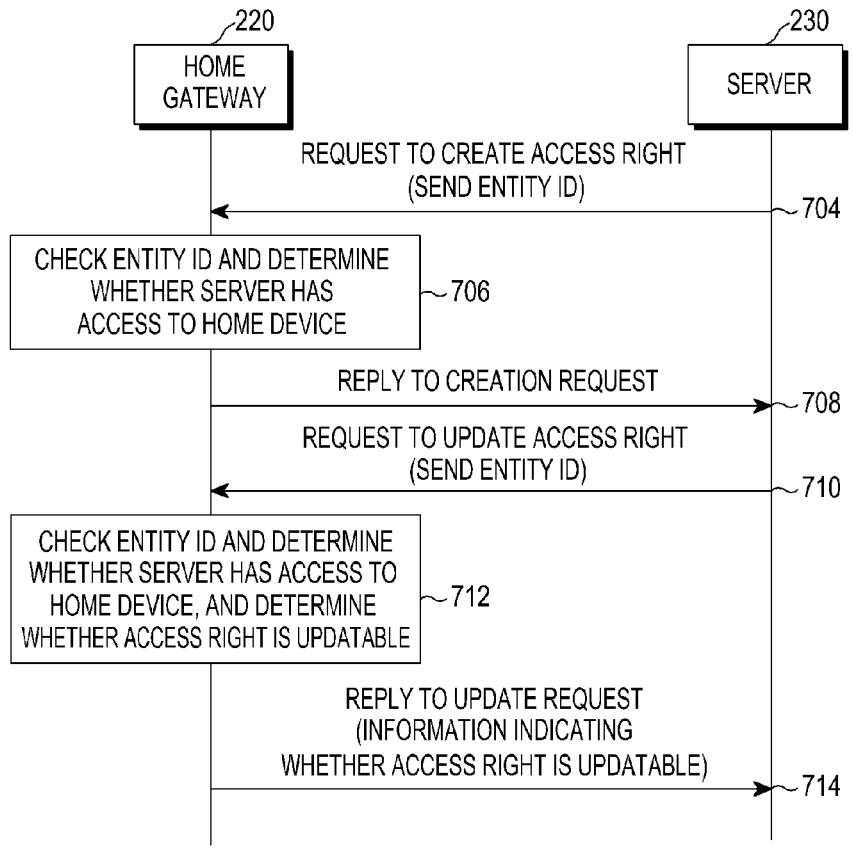
FIG. 7 is flowchart illustrating operations between a home gateway and a server creating and updating an access right to a home device according to an embodiment of the present disclosure.

Referring to FIG. 7, assume that the server 230 determines to make a request to create an access right of the server 230 to a particular home device. The creation request may include identification information and performance information of the server 230, which is a requesting entity, and an entity ID of a target entity to which the access right of the server 230 is to be created, i.e., an entity ID of the particular home device. In this case, in operation 704, the server 230 may send the creation request to the home gateway 220.

In operation 706, the home gateway 220 may determine whether the server 230 corresponding to the identification information has access to the home device corresponding to the entity ID. Specifically, the home gateway 220 may store performance information of the server 230 in relation to applications or functions that the server 230 supports for each home device. The home gateway 220 may determine whether the performance information of the server 230 supports performance of a home device corresponding to the entity ID. If the performance information of the server 230 supports the performance of the home device corresponding to the entity ID, the home gateway 220 may set the access right of the server 230 to the home device to be 'allowed'. Otherwise, if the performance information of the server 230 does not support the performance of the home device corresponding to the entity ID, the home gateway 220 may set the access right of the server 230 to the home device to be 'disallowed'.

In operation 708, the home gateway 220 may send the server 230 a reply to the creation request, the reply including access right information to the home device of the server 230.

Although not illustrated in FIG. 7, the home gateway 220 may configure access right information of each server to a corresponding home device for each application or function of the home device. The home gateway 220 may store the access right information by mapping it onto the corresponding server, home device, and application or function.

Also, in operation 708, the server 230 may check the reply to the creation request for the access right information and store the access right information in which the access right to the home device or to each application or function of the home device is set to be 'allowed' or 'disallowed'.

In operation 710, the server 230 may send the home gateway 220 a request to update the access right to the home device. The update request may also include identification information and performance information of the server 230, which is a requesting entity, and an entity ID of a target entity to which the access right of the server 230 is to be updated, i.e., an entity ID of the particular home device.

In operation 712, the home gateway 220 may determine whether the server 230 corresponding to the identification information has access to the home device corresponding to the entity ID, description of which is omitted herein because it is the same as operation 706. The home gateway 220 may determine whether it is possible to update the access right to the home device. Based on the determination, the home gateway 220 configure information indicating whether update of the access right to the home device is 'allowed' or 'disallowed'.

In operation 714, the home gateway 220 may send the server 230 the information indicating whether update of the access right to the home device is allowed or disallowed in a reply to the update request.

Figure 8:
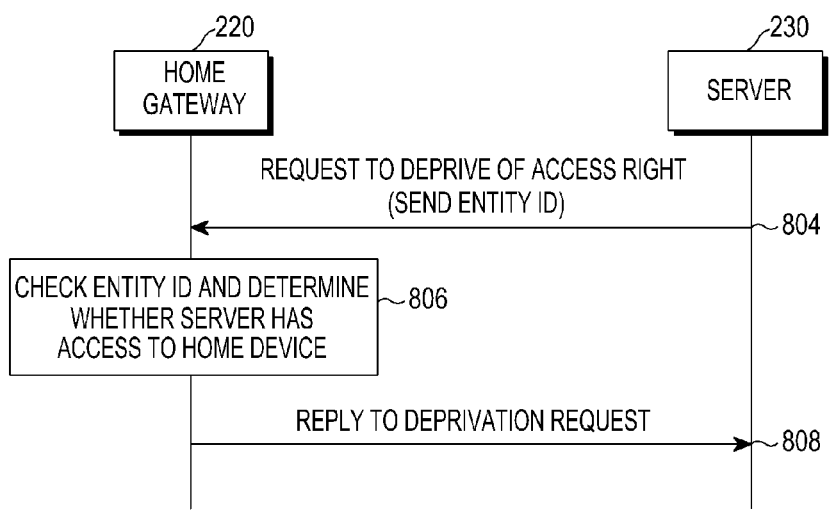
FIG. 8 is flowchart illustrating operations between a home gateway and a server depriving an access right of a server to a home device according to an embodiment of the present disclosure.

FIG. 8 is flowchart illustrating operations between the home gateway 220 and the server 230 depriving of an access right of a server to a home device according to an embodiment of the present disclosure.

Referring to FIG. 8, assume that the server 230 sends the home gateway 220 a request to deprive of the access right of the server 230 to a home device. The deprivation request may also include identification information of a requesting entity, i.e., the server 230 and an entity ID of a target entity for which the access right of the server 230 is to be deprived of, i.e., the home device. In this case, in operation 804, the server 230 may send the deprivation request to the home gateway 220.

In operation 806, the home gateway 220 may determine whether deprivation of the access right to the home device of the server 230 corresponding to the identification information is possible.

If determining that deprivation of the access right to the home device of the server 230 is possible, the home gateway 220 may remove the identification information corresponding to the server 230 from the access right information of the server to the home device.

Figure 9A:
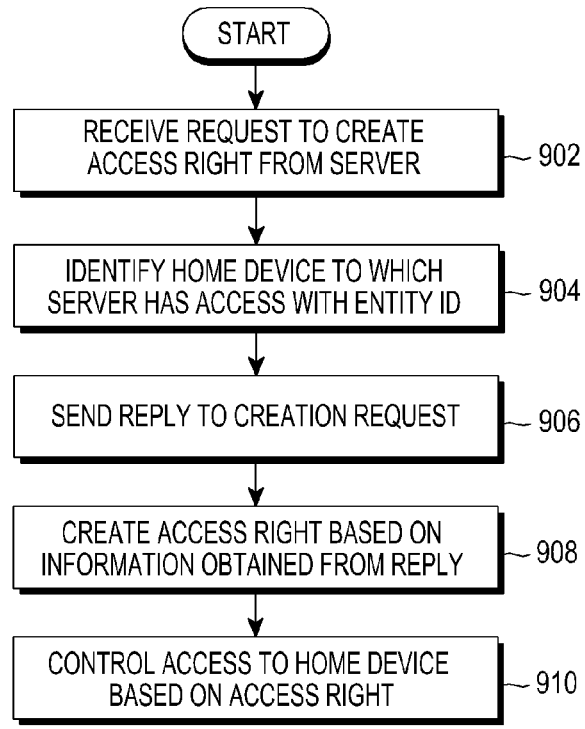
FIG. 9A is flowchart illustrating operations of a home gateway creating an access right of a server to a home device according to an embodiment of the present disclosure.

In operation 808, the home gateway 220 may send the server 230 information notifying the server 230 that the access right of the server 230 to the home device is deprived of FIG. 9A is flowchart illustrating operations of a home gateway creating an access right of a server to a home device according to an embodiment of the present disclosure.

Referring to FIG. 9A, in operation 902, the home gateway may receive a request to create an access right to a home device from the server. The creation request may include an entity ID of the server and identification information of a target entity to which the access right is to be created, i.e., the home device.

In operation 904, the home gateway may determine whether the server corresponding to the entity ID has access to a home device corresponding to the identification information. For example, the home gateway may determine whether the identification information of the target entity, i.e., the home device has a match among pre-stored identification information of home devices, applications or functions to which the server has access. If there is a match of the identification information, the home gateway may determine that the server has access to the particular home device corresponding to the identification information and set an access right to the particular home device to be 'allowed'. Also, for applications or functions that the particular home device supports, if determining that the server has access to the applications or functions, the home gateway may set access rights to the applications or functions to be 'allowed'. Otherwise, if determining that the sever does not have access to the particular home device, the home gateway may set the access right of the server to the particular home device of the server to be 'disallowed'. In operation 906, the home gateway may send the server information indicating whether the server has access to the particular home device or information about the access right to the particular home device in a reply to the creation request.

In operation 908, based on the reply that includes the information indicating whether the server has access to the particular home device, the home gateway may create the access right of the server to the particular home device. Specifically, if the information indicates that the server has access to the particular home device, the home gateway may set the access right of the server to the particular home device to be 'allowed'. Otherwise, if the information indicates that the server does not have access to the particular home device, the home gateway may set the access right of the server to the particular home device to be 'disallowed'. If the home gateway obtains the access right information from the reply, the home gateway may store the access right information by mapping it onto the corresponding entity ID.

After that, in operation 910, the home gateway may control access to a home device of a particular server based on the stored information about the access right to the home device of the particular server.

Figure 9B:
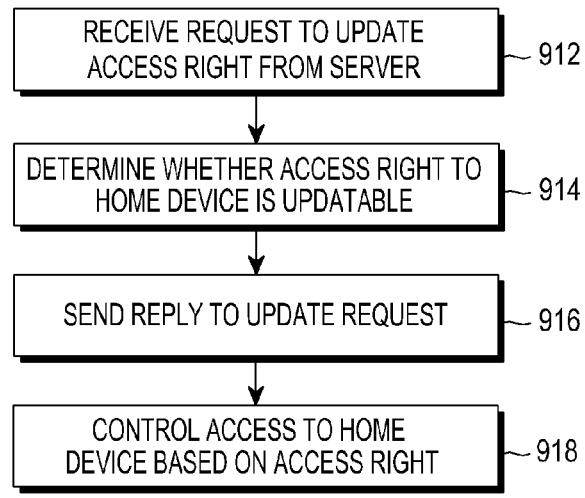
FIG. 9B is flowchart illustrating operations of a home gateway updating an access right of a server to a home device according to an embodiment of the present disclosure.

FIG. 9B is flowchart illustrating operations of a home gateway updating an access right of a server to a home device according to an embodiment of the present disclosure.

Referring to FIG. 9B, in operation 912, the home gateway may receive a request to update an access right to a home device from a server. The update request may include an entity ID of the server and identification information of a target entity, access right to which is to be updated, i.e., the home device.

In operation 914, the home gateway may determine whether a server corresponding to the entity ID included in the update request has access to a home device corresponding to the identification information, and determine whether update of the access right of the server to the home device is possible. Furthermore, the home gateway may configure information indicating whether update of the access right of entity ID is allowed or disallowed based on the determination made in operation 914.

In operation 916, the home gateway may send the server a reply to the update request, including the information indicating whether update of the access right is allowed or disallowed. Specifically, the information may indicate whether update of the access right to the home device corresponding to the entity ID included in the update request is allowed or disallowed.

Also, in operation 916, the home gateway may update the access right of the server to the home device based on the information indicating whether update of the access right is allowed or disallowed, and store the updated access right information by mapping it onto the corresponding entity ID.

After that, in operation 918, the home gateway 220 may control access to a home device of a particular server based on the stored access right information to the home device of the particular server.

Figure 10A:
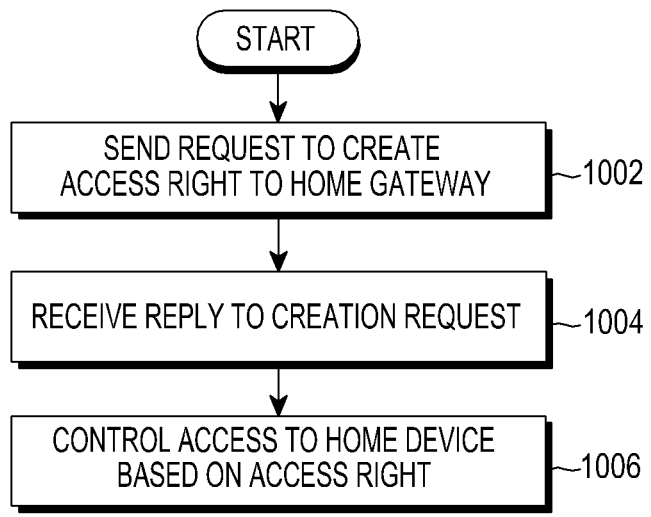
FIG. 10A is flowchart illustrating operations of a server creating an access right to a home device according to an embodiment of the present disclosure.

FIG. 10A is flowchart illustrating operations of a server creating an access right to a home device according to an embodiment of the present disclosure.

Referring to FIG. 10A, in operation 1002, the server may send the home gateway a request to create an access right including an entity ID of the server. The creation request may include an entity ID of the server and identification information of a target entity, the access right of which is to be created, i.e., the home device.

In operation 1004, the server may receive a reply to the creation request from the home gateway. The reply may include information indicating whether the server has access to the target entity, or information about an access right to a home device of the server, which is configured based on the information indicating whether the server has access to the target entity. The server may create an access right based on the information indicating whether the server has access to the target entity.

In operation 1006, the server may control access to the particular home device based on the information about the access right to the home device.

Figure 10B:
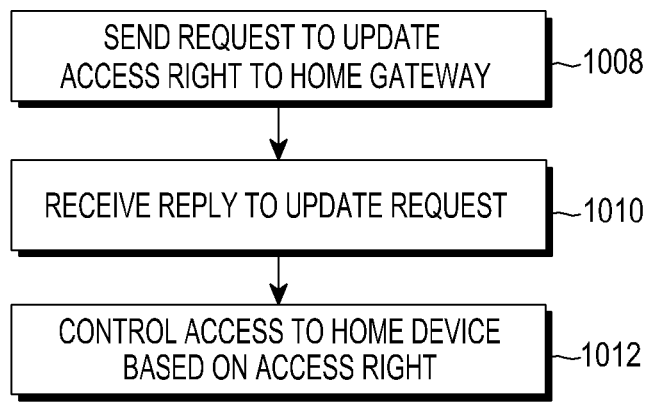
FIG. 10B is flowchart illustrating operations of a server updating an access right to a home device according to an embodiment of the present disclosure.

FIG. 10B is flowchart illustrating operations of a server updating an access right to a home device according to an embodiment of the present disclosure.

Referring to FIG. 10B, in operation 1008, the server may send the home gateway a request to update an access right, including an entity ID of the server.

In operation 1010, the server may receive a reply to the update request from the home gateway. The reply may include information indicating whether update of the access right is possible. The information may include information indicating that update of the access right is allowed or information indicating that update of the access right is disallowed.

In operation 1012, the server may control access to the particular home device based on the information about access right to the home device.

The present disclosure provides an advantage of providing a differentiated service for each of home devices and an external server, by a home gateway establishing an access right to control access to the home devices and the external server connected to the home gateway and providing access of the external server to the home device or access of the home device to the external server for each supported function or application based on the established access right.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling access by a gateway in a home network system, the method comprising:
   receiving, from a device, a first access restriction request comprising server identification information and first restriction information, the first restriction information indicating at least one of at least one first restriction function and at least one first restriction application, the at least one first restriction function and the at least one first restriction application provided by a server identified by the server identification information;
   receiving, from the server, a second access restriction request comprising device identification information and second restriction information, the second restriction information indicating at least one of at least one second restriction function and at least one second restriction application, the at least one second restriction function and the at least one second restriction application provided by a device identified by the device identification information;
   generating a first restriction list based on the server identification information and the first restriction information;
   storing the first restriction list in a database;
   generating a second restriction list based on the device identification information and the second restriction information;
   storing the second restriction list in the database;
   receiving, from the server, a first access request comprising a device identification information and at least one of a first request function indicator and a first request application indicator;
   determining whether a first requested function or a first requested application identified by the at least one of the first request function indicator and the first request application indicator is included in the first restriction list;
   when the first requested function or the first requested application is included in the first restriction list, transmitting, to the server, a response indicating that access to the first requested function or the first requested application is restricted to the device;
   receiving, from the device, a second access request comprising a server identification information and at least one of a second request function indicator and a second request application indicator;
   determining whether a second requested function or a second requested application identified by the at least one of the second request function indicator and the second request application indicator is included in the second restriction list;
   when the second requested function or the second requested application is included in the second restriction list, transmitting, to the device, a response indicating that access to the second requested function or the second requested application is restricted to the server;
   receiving, from the device, a delete request comprising the at least one of the first request function indicator and the first request application indicator;
   after deleting the at least one of the first request function and the first request application in the first restriction list, receiving, from the server, the first access request; and
   transmitting, to the server, a response indicating that access to the first requested function or the first requested application is permitted.

2. The method of claim 1, further comprising:
   receiving, from the server, a delete request comprising the at least one of the second request function indicator and the second request application indicator;
   after deleting the at least one of the second request function and the second request application in the second restriction list, receiving, from the device, the second access request; and
   transmitting, to the device, a response indicating that access to the second function or the second application is permitted.

3. A method for receiving a service by a device in a home network system, the method comprising:
   generating an access restriction request comprising server identification information, and first restriction information, the first restriction information indicating at least one of at least one first restriction function and at least one first restriction application, the at least one first restriction function and the at least one first restriction application provided by a server identified by the server identification information;
   transmitting, to a gateway, the access restriction request;
   transmitting, to a gateway, an access request comprising server identification information and at least one of a second request function indicator and a second request application indicator; and
   when a second requested function or a second requested application identified the at least one of the second request function indicator and the second request application indicator is included in a second restriction list, the second restriction list generated based on device identification information and second restriction information, receiving, from the gateway, a response indicating that access to the second requested function or the second requested application is restricted to the server, wherein the second restriction information indicates that at least one of at least one second restriction function and at least one second restriction application, the at least one second restriction function and the at least one second restriction application provided by a device identified by the device identification information, and wherein, after deleting the at least one of the second request function and the second request application in the second restriction list based on a delete request comprising the at least one of the second request function indicator and the second request application indicator by the server, when the access request is transmitted to the gateway, a response indicating that access to the second function or the second application is permitted, is received, from the gateway.

4. The method of claim 3, further comprising:

transmitting, to the gateway, a delete request comprising the at least one of the first request function indicator and the first request application indicator.

5. A gateway for controlling access in a home network system, the gateway comprising:

a receiver configured to:
  receive, from a device, a first access restriction request comprising server identification information, and first restriction information, the first restriction information indicating at least one of at least one first restriction function and at least one first restriction application, the at least one first restriction function and the at least one first restriction application provided by a server identified by the server identification information,
  receive, from the server, a second access restriction request comprising device identification information, and second restriction information, the second restriction information indicating at least one of at least one second restriction function and at least one second restriction application, the at least one second restriction function and the at least one second restriction application provided by a device identified by the device identification information,
  receive, from the server, a first access request comprising a device identification information and at least one of a first request function indicator and a first request application indicator, and
  receive, from the device, a second access request comprising the server identification information and at least one of a second request function indicator and a second request application indicator; a controller configured to:
generate a first restriction list based on the server identification information and the first restriction information, store the first restriction list in a database,
generate a second restriction list based on the device identification information and the second restriction information, store the second restriction list in the database, determine whether a first requested function or a first requested application identified by the at least one of the first request function indicator and the first request application indicator is included in the first restriction list, and
determine whether a second requested function or a second requested application identified by the at least one of the second request function indicator and the second request application indicator is included in the second restriction list; and
a transmitter configured to:
when the first requested function or the first requested application identification is included in the first restriction list, transmit to the server, a response indicating that access to the first requested function or the first requested application is restricted to the device, and
when the second requested function or the second requested application is included in the second restriction list, transmit, to the device, a response indicating that access to the second requested function or the second requested application is restricted to the server
wherein the receiver is configured to receive, from the device, a delete request comprising the at least one of the first request function indicator and the first request application indicator,
wherein, after deleting the at least one of the first request function and the first request application in the first restriction list, the receiver is configured to receive, from the server, the first access request, and
wherein the transmitter is configured to transmit, to the server, a response indicating that access to the first requested function or the first requested application is permitted.

6. The gateway of claim 5, wherein the receiver is configured to receive, from the server, a delete request comprising the at least one of the second request function indicator and the second request application indicator,
wherein, after deleting the at least one of the second request function and the second request application in the second restriction list, the receiver is configured to receive, from the device, the second access request, and
wherein the transmitter is configured to transmit, to the device, a response indicating that access to the second function or the second application is permitted.

7. A device for receiving a service in a home network system, the device comprising:

a controller configured to generate an access restriction request comprising server identification information, and first restriction information, the first restriction information indicating at least one of at least one first restriction function and at least one first restriction application, the at least one first restriction function and the at least one first restriction application provided by a server identified by the server identification information;
a transmitter configured to transmit, to a gateway the access restriction request, and an access request comprising server identification information and at least one of a second request function indicator and a second request application indicator; and
a receiver configured to, when a second requested function or a second requested application identified the at least one of the second request function indicator and the second request application indicator is included in a second restriction list, the second restriction list generated based on device identification information and second restriction information, receive, from the gateway, a response indicating that access to the second requested function or the second requested application is restricted to the server, wherein the second restriction information indicates that at least one of at least one second restriction function and at least one second restriction application, the at least one second restriction function and the at least one second restriction application provided by a device identified by the device identification information, and wherein, after deleting the at least one of the second request function and the second request application in the second restriction list based on a delete request comprising the at least one of the second request function indicator and the second request application indicator by the server, when the access request is transmitted to the gateway, the receiver is configured to receive, from the gateway, a response indicating that access to the second function or the second application is permitted.

8. The method of claim 7, wherein the transmitter is configured to transmit, to the gateway, a delete request comprising the at least one of the first request function indicator and the first request application indicator.

* * * * *